United States Patent
Sugimoto et al.

(10) Patent No.: US 9,429,347 B2
(45) Date of Patent: Aug. 30, 2016

(54) REFRIGERATION APPARATUS

(75) Inventors: Takeshi Sugimoto, Tokyo (JP); Tetsuya Yamashita, Tokyo (JP); Takashi Ikeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 207 days.

(21) Appl. No.: 14/117,667

(22) PCT Filed: Aug. 4, 2011

(86) PCT No.: PCT/JP2011/004422
§ 371 (c)(1),
(2), (4) Date: Nov. 14, 2013

(87) PCT Pub. No.: WO2013/018148
PCT Pub. Date: Feb. 7, 2013

(65) Prior Publication Data
US 2014/0083124 A1 Mar. 27, 2014

(51) Int. Cl.
*F25B 49/02* (2006.01)
*F25B 7/00* (2006.01)
(Continued)

(52) U.S. Cl.
CPC .............. *F25B 49/022* (2013.01); *F25B 6/04* (2013.01); *F25B 7/00* (2013.01); *F25B 9/008* (2013.01);
(Continued)

(58) Field of Classification Search
CPC .............. F25B 7/00; F25B 6/04; F25B 9/08; F25B 2600/0253; F25B 1/00; F25B 49/022; F25B 2400/121; F25B 2600/0272; Y02B 30/741
See application file for complete search history.

(56) References Cited

U.S. PATENT DOCUMENTS 4,788,829 A * 12/1988 Takemasa ................. F25B 5/00
62/113
5,323,619 A * 6/1994 Kim .......................... F24F 11/08
62/160
(Continued)

FOREIGN PATENT DOCUMENTS

CN 1982808 A 6/2007
CN 102066852 A 5/2011
(Continued)

OTHER PUBLICATIONS

Office Action dated Feb. 10, 2015 issued in corresponding CN patent application No. 201180071900X (and English translation).
(Continued)

*Primary Examiner* — Allen Flanigan
*Assistant Examiner* — Kun Kai Ma
(74) *Attorney, Agent, or Firm* — Posz Law Group, PLC

(57) ABSTRACT

A refrigeration apparatus includes a high-temperature side circulation circuit, a low-temperature side circulation circuit, a cascade capacitor, and control means. The high-temperature side circulation circuit forms a refrigerant circuit in which a high-temperature side compressor, a high-temperature side condenser, a high-temperature side expansion device, and a high-temperature side evaporator are connected by a pipe. The refrigerant circuit allows a high-temperature side refrigerant to circulate therethrough. The high-temperature side refrigerant has a carbon-carbon double bond in its molecular structure. The high-temperature side compressor has a variable discharge capacity and is configured to discharge the high-temperature side refrigerant. The low-temperature side circulation circuit forms a refrigerant circuit in which a low-temperature side compressor, a low-temperature side condenser, a low-temperature side expansion device, and a low-temperature side evaporator are connected by a pipe. The refrigerant circuit allows a low-temperature side refrigerant to circulate therethrough. The low-temperature side refrigerant contains carbon dioxide.

12 Claims, 4 Drawing Sheets

(51) Int. Cl.
F25B 6/04 (2006.01)
F25B 9/00 (2006.01)

(52) U.S. Cl.
CPC .. *F25B 2400/121* (2013.01); *F25B 2600/0253* (2013.01); *F25B 2600/0272* (2013.01); *F25B 2700/1933* (2013.01); *Y02B 30/741* (2013.01)

(56) References Cited

U.S. PATENT DOCUMENTS

| | | | | |
|---|---|---|---|---|
| 6,557,361 | B1* | 5/2003 | Howard | F25B 7/00 62/175 |
| 2001/0048031 | A1* | 12/2001 | Noro | F24H 4/04 237/2 B |
| 2007/0090200 | A1* | 4/2007 | Lamb | F28F 27/02 236/93 A |
| 2007/0107451 | A1 | 5/2007 | Sakurai et al. | |
| 2009/0120117 | A1* | 5/2009 | Martin | F25B 7/00 62/246 |
| 2010/0147006 | A1* | 6/2010 | Taras | F25B 7/00 62/335 |
| 2010/0175400 | A1* | 7/2010 | Kasahara | F25B 1/10 62/225 |
| 2010/0205987 | A1* | 8/2010 | Okazaki | F25B 9/008 62/190 |
| 2011/0079042 | A1* | 4/2011 | Yamashita | C09K 5/045 62/498 |
| 2011/0126575 | A1* | 6/2011 | Kobayashi | F25B 7/00 62/333 |
| 2011/0289953 | A1* | 12/2011 | Alston | B60H 1/32 62/238.6 |
| 2012/0304687 | A1* | 12/2012 | Sato | C09K 5/045 62/502 |

FOREIGN PATENT DOCUMENTS

| | | | |
|---|---|---|---|
| DE | 102008047753 | A1 | 3/2010 |
| JP | 62-77554 | A | 4/1987 |
| JP | 2002-286310 | A | 10/2002 |
| JP | 2003-056948 | A | 2/2003 |
| JP | 2004-205193 | A | 7/2004 |
| JP | 2005-077042 | A | 3/2005 |
| JP | 2009-300000 | A | 12/2009 |
| JP | 2009300000 | A * | 12/2009 |
| JP | 2010-002134 | A | 1/2010 |
| JP | 2010-007874 | A | 1/2010 |
| JP | 2010-043749 | A | 2/2010 |
| JP | 2010-175203 | A | 8/2010 |
| JP | 2010-021851 | A | 2/2011 |
| JP | 2011-21851 | A | 2/2011 |
| JP | 2011-069529 | A | 4/2011 |
| WO | 2011/056824 | A2 | 5/2011 |

OTHER PUBLICATIONS

Office Action dated Mar. 3, 2015 issued in corresponding JP patent application No. 2013-526618 (and English translation).
Extended European Search Report mailed Mar. 18, 2015 in the corresponding European Patent application No. 11870484.0.
Office Action dated Aug. 20, 2015 issued in corresponding CN patent application No. 201180071900.X (and English translation).
Office Action issued Oct. 21, 2014 for the corresponding JP application No. 2013-526618 (and English translation).
International Search Report of the International Searching Authority mailed Nov. 8, 2011 for the corresponding international application No. PCT/JP2011/004422.
Office Action issued Dec. 21, 2015 in the corresponding CN application No. 201180071900.X (with English translation).
Office Action issued Mar. 14, 2016 in the corresponding CN patent application No. 201180071900.X (and English translation).

* cited by examiner

REFRIGERATION APPARATUS

CROSS REFERENCE TO RELATED APPLICATION

This application is a U.S. national stage application of PCT/JP2011/004422 filed on Aug. 4, 2011, the disclosure of which is incorporated by reference.

TECHNICAL FIELD

The present invention relates to a refrigeration apparatus. In particular, it relates to a refrigeration apparatus that supports the use of HFO refrigerants or the like.

BACKGROUND

In recent years, from the viewpoint of preventing the destruction of the ozone layer, refrigerants enclosed in refrigeration cycle apparatuses that cool objects using refrigerant circulations (refrigeration cycles) have shifted from traditional refrigerants to chlorine-free refrigerants. Because chlorine-free HFC refrigerants (e.g., R410A, R404A) have relatively high warming potential, measures are taken to prevent leakage of the refrigerants to outside the refrigeration apparatuses, and it is mandatory to collect the refrigerants at the time of disposal of the apparatuses. However, because the collection rate may be insufficient and the refrigerants may leak when in use, a further shift to refrigerants with small global warming potential (GWP) values has been demanded. Examples of such refrigerants with small GWP values under study include natural refrigerants, such as carbon dioxide, and HFO (olefinic fluorine compound)-based refrigerants (hereinafter referred to as HFO refrigerants), such as HFO-1234yf (hydrofluoroolefin) and HFO-1234ze (tetrafluoropropen).

One example of a traditional refrigeration apparatus that uses an HFO refrigerant is an apparatus that includes an ejector and a gas-liquid separator (see, for example, Patent Literature 1). In this apparatus, a gas refrigerant separated in the gas-liquid separator is returned to a compressor, and a liquid refrigerant separated in the gas-liquid separator is made to evaporate in an evaporator and then sucked into the ejector.

Patent Literature

Patent Literature 1: Japanese Unexamined Patent Application Publication No. 2010-2134 (page 8, FIG. 1)

Here, an HFO refrigerant has a molecular structure with a carbon-carbon double bond. In general, a functional group of a carbon-carbon double bond or triple bond, in other words, (unsaturated hydrocarbon), such as alkene or alkyne, has characteristics in which various molecules undergo addition reactions. Thus, in contrast to traditional refrigerants with no multiple bonds, refrigerants with carbon-carbon multiple bonds has properties in which their multiple bond portions tend to cleave, their functional groups tend to react with other substances, and their chemical stability is significantly low. In particular, the refrigerants tend to be decomposed by reaction with air or moisture as contaminants into refrigerant circuits.

Of the HFO refrigerants, HFO-1234yf has a boiling point under an atmospheric pressure of approximately −29.4 degrees C., and HFO-1234ze has that of approximately −19.0 degrees C. These boiling points are higher than those of other refrigerants. Thus, for example, when an outside air temperature is low in winter, it is likely that, in particular, a portion on the low-pressure side in a refrigerant circuit has a negative pressure with respect to the pressure outside the circuit. If a refrigerant pipe has a defect or the like, there is an increased risk that air or moisture may enter the refrigerant circuit, and the air through the defective portion may react with the refrigerant, decomposition of the refrigerant may be stimulated, sludge or the like may be produced in the refrigerant circuit.

In addition, HFO refrigerants have high boiling points. For example, unlike an HFC refrigerant, such as R404A, it is difficult to control an HFO refrigerant such that its evaporating temperature is −45 degrees C. to −20 degrees C. and to use the refrigerant in cooling in a low-temperature range. Thus, it cannot be used as a refrigerant in a refrigeration apparatus for storing frozen foods or the like.

The refrigeration apparatus described in Patent Literature 1 includes the gas-liquid separator and the ejector to reduce the range where the low-temperature side has a negative pressure, to enable being used in a low-temperature range, and to extend the usage temperature range. A refrigerant in a vapor phase state separated by the gas-liquid separator is guided to the compressor, and a liquid-phase refrigerant is sucked into the ejector. Increasing the pressure on the low-pressure side in the refrigerant circuit by the ejector reduces the risk of entry of air, water, or the like into the refrigerant circuit, reduces the evaporating temperature, and extends the temperature range where the apparatus can perform cooling.

However, a pressure increase achieved by the ejector corresponds to the order of approximately 5 to 10K. In contrast, in the case of HFO-1234yf, because its boiling point is approximately −29.4 degrees C., even if a pressure increase corresponding to 10K is accomplished, its evaporating temperature is approximately −39.4 degrees C. The possibility that a part inside the refrigerant circuit has a negative pressure still remains. For example, if a refrigerant pipe has a defect or the like, there is concern about the decomposition of the refrigerant or the like caused by the entry of air, moisture, or the like into the refrigerant circuit. Accordingly, it is difficult to use the refrigerant in the low-temperature range where frozen foods are stored.

Additionally, because the flow rate significantly changes in the ejector, a high accuracy of processing the ejector structure is needed to achieve sufficient efficiency. Thus, in the field where a wide-range refrigeration capacity is required, ejectors having various capacities must be developed, and the development period, cost, and the like for them are burdensome.

SUMMARY

Accordingly, the invention provides a refrigeration apparatus that has a low GWP, uses an HFO refrigerant or the like having a molecular structure containing a carbon-carbon multiple bond, suppresses the production of sludge or the like, has a wide cooling temperature range, and can be used in cooling in a low-temperature range.

A refrigeration apparatus according to the invention includes a high-temperature side circulation circuit, a low-temperature side circulation circuit, a cascade capacitor, and control means. The high-temperature side circulation circuit forms a refrigerant circuit in which a high-temperature side compressor, a high-temperature side condenser, a high-temperature side expansion device, and a high-temperature side evaporator are connected by a pipe. The refrigerant circuit allows a high-temperature side refrigerant to circulate therethrough. The high-temperature side refrigerant has a carbon-carbon double bond in its molecular structure. The high-temperature side compressor has a variable discharge capacity and is configured to discharge the high-temperature side refrigerant. The low-temperature side circulation circuit forms a refrigerant circuit in which a low-temperature side compressor, a low-temperature side condenser, a low-temperature side expansion device, and a low-temperature side evaporator are connected by a pipe. The refrigerant circuit allows a low-temperature side refrigerant to circulate therethrough. The low-temperature side refrigerant contains carbon dioxide. The low-temperature side compressor is configured to discharge the low-temperature side refrigerant. The cascade capacitor is formed of the high-temperature side evaporator and the low-temperature side condenser and configured to cause heat exchange between the high-temperature side refrigerant and the low-temperature side refrigerant. The control means is configured to control an evaporating temperature of the high-temperature side refrigerant in the high-temperature side evaporator on the basis of the pressure according to detection by pressure detecting means such that a pressure inside the high-temperature side circulation circuit does not have a negative pressure with respect to a pressure outside the circuit.

According to the invention, the high-temperature side refrigerant circulating through the high-temperature side circulation circuit is a refrigerant having a carbon-carbon double bond in its molecular structure, the low-temperature side refrigerant circulating through the low-temperature side circulation circuit is a carbon dioxide refrigerant, and the evaporating temperature in the high-temperature side evaporator is prevented from being at or below the boiling point of the high-temperature side refrigerant. This can avoid the inside of the high-temperature side circulation circuit from having a negative pressure and can prevent the entry of air or the like into the high-temperature side circulation circuit. Even when the evaporating temperature in the high-temperature side circulation circuit is high, cooling to a low-temperature range can be achieved in the low-temperature side circulation circuit, and the cooling temperature range can be extended. The efficient refrigeration apparatus having low GWP can be provided.

DETAILED DESCRIPTION

Embodiment 1

Figure 1:
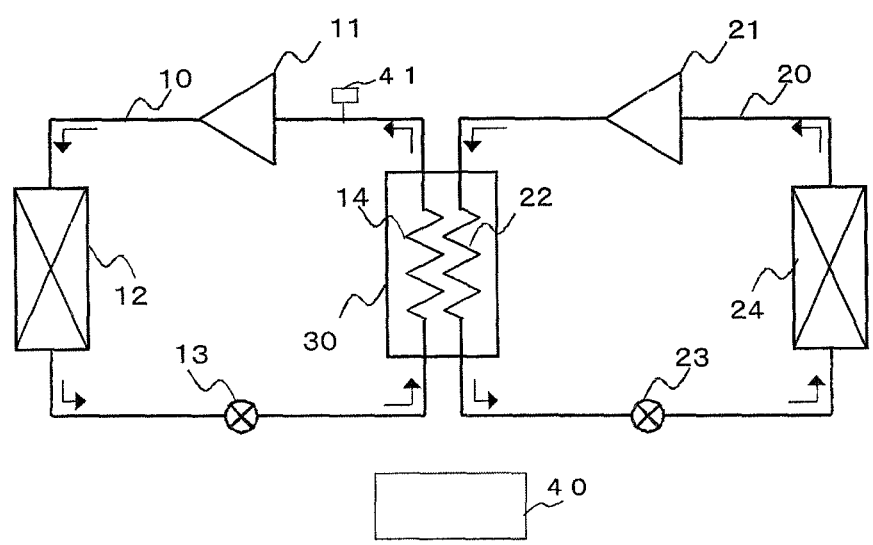
FIG. 1 illustrates a structure of a refrigeration apparatus according to Embodiment 1 of the invention.

FIG. 1 illustrates a structure of a refrigeration apparatus according to Embodiment 1 of the invention. Here, a cascade refrigeration apparatus that includes two-stage refrigerant circuitry is described as one example of the refrigeration cycle apparatus. As illustrated in FIG. 1, the cascade refrigeration apparatus according to Embodiment 1 includes a high-temperature side circulation circuit 10 and a low-temperature side circulation circuit 20. The high-temperature side circulation circuit 10 and the low-temperature side circulation circuit 20 form refrigerant circuits that allow refrigerants to circulate therethrough independently of each other. To make the two refrigerant circuits operate as a multistage structure, the refrigeration apparatus includes a cascade capacitor (refrigerant-to-refrigerant heat exchanger) 30. The cascade capacitor 30 is configured such that a high-temperature side evaporator 14 and a low-temperature side condenser 22 are coupled so as to allow heat exchange between the refrigerant passing through the high-temperature side evaporator 14 and that passing through the low-temperature side condenser 22. The refrigeration apparatus further includes control means 40 for controlling operations of the cascade refrigeration apparatus described below. Here, high and low in temperatures and pressures are not determined from the relationship with specific values, but are relatively determined in states, actions, or the like of the system, apparatus, or the like.

In FIG. 1, the high-temperature side circulation circuit 10 forms the refrigerant circuit in which a high-temperature side compressor 11, a high-temperature side condenser 12, a high-temperature side expansion device 13, and a high-temperature side evaporator 14 are connected in series by a refrigerant pipe. The low-temperature side circulation circuit 20 forms the refrigerant circuit in which a low-temperature side compressor 21, a low-temperature side condenser 22, a low-temperature side expansion device 23, and a low-temperature side evaporator 24 are connected in series by a refrigerant pipe.

Here, an HFO (tetrafluoropropen) refrigerant containing a carbon-carbon double bond, such as HFO-1234yf or HFO-1234ze, is used as the refrigerant circulating through the high-temperature side circulation circuit (hereinafter referred to as high-temperature side refrigerant). Here, the high-temperature side refrigerant is a single HFO refrigerant. However, other refrigerants, for example, a mixed refrigerant of HFO-1234yf and R32 may also be used as the high-temperature side refrigerant. A refrigerant containing carbon dioxide ($CO_2$) (carbon dioxide refrigerant) is used as the refrigerant circulating through the low-temperature side circulation circuit (hereinafter referred to as low-temperature side refrigerant).

The high-temperature side compressor 11 in the high-temperature side circulation circuit 10 sucks the high-temperature side refrigerant, compresses it, brings it into a high-temperature and high-pressure state, and discharges it. Here, the high-temperature side compressor 11 according to Embodiment 1 is a compressor of the type in which the operation frequency can be controlled using, for example, an inverter circuit and the amount of discharging the high-temperature side refrigerant can be adjusted (variable capacity). The high-temperature side condenser 12 causes heat exchange between air, water, or the like supplied from, for example, a fan or a pump (not illustrated) and the high-temperature side refrigerant, and makes the high-temperature side refrigerant condense and liquefy.

The high-temperature side expansion device 13 including a pressure reducing valve, an expansion valve, or the like is configured to reduce the pressure of the high-temperature side refrigerant and expand it. Most preferably, the high-temperature side expansion device 13 may comprise flow control means, such as an electronic expansion valve. The high-temperature side expansion device 13 may comprise refrigerant flow adjusting means, such as a capillary or a temperature-sensitive expansion valve. The high-temperature side evaporator 14 makes the high-temperature side refrigerant evaporate and gasify by heat exchange. For example, here, a heat exchange pipe or the like through which the high-temperature side refrigerant passes in the cascade capacitor 30 serves as the high-temperature side evaporator 14, and it enables heat exchange with the low-temperature side refrigerant.

The low-temperature side compressor 21 in the low-temperature side circulation circuit 20 sucks the low-temperature side refrigerant, compresses it, brings it into a high-temperature and high-pressure state, and discharges it. Here, the low-temperature side compressor 21 may also comprise a compressor of the type in which it includes, for example, an inverter circuit and can adjust the amount of discharging the low-temperature side refrigerant. The high-temperature side condenser 22 makes the high-temperature side refrigerant condense and liquefy by heat exchange. For example, here, a heat exchange pipe or the like through which the low-temperature side refrigerant passes in the cascade capacitor 30 serves as the low-temperature side condenser 22, and it enables heat exchange with the high-temperature side refrigerant.

The low-temperature side expansion device 23 including a pressure reducing valve, an expansion valve, or the like is configured to reduce the pressure of the low-temperature side refrigerant and expand it. Most preferably, the low-temperature side expansion device 23 may comprise flow control means, such as an electronic expansion valve. The low-temperature side expansion device 23 may comprise refrigerant flow adjusting means, such as a capillary. Here, it is assumed that the low-temperature side expansion device 23 comprises flow control means for adjusting its opening degree on the basis of an instruction from the control means 40. For example, if the low-temperature side expansion device 23 is refrigerant flow adjusting means that cannot adjust its opening degree, in order to minimize the expanding function and reduce the pressure loss or the like, a bypass pipe (not illustrated) may be disposed in parallel with the low-temperature side expansion device 23. The refrigeration apparatus may be configured to be able to perform switching such that the refrigerant flows into the bypass pipe if the refrigerant flow adjusting means is not needed.

The low-temperature side evaporator 24 causes heat exchange between air, brine, or the like supplied from, for example, a fan or a pump (not illustrated) and the low-temperature side refrigerant, and makes the low-temperature side refrigerant evaporate and gasify. The heat exchange with the low-temperature side refrigerant directly or indirectly cools cooling target objects or the like.

The cascade capacitor 30 has the functions of the high-temperature side evaporator 14 and the low-temperature side condenser 22 described above and is a refrigerant-to-refrigerant heat exchanger that enables heat exchange between the high-temperature side refrigerant and the low-temperature side refrigerant. The cascade capacitor 30 may comprise a plate heat exchanger or a double-pipe heat exchanger, for example. Making the high-temperature side circulation circuit and the low-temperature side circulation circuit comprise as a multistage structure via the cascade capacitor 30 to carry out heat exchange between the refrigerants enables the independent refrigerant circuits to cooperate with each other.

The control means 40 monitors the states of the high-temperature side circulation circuit 10 and the low-temperature side circulation circuit 20 and controls operations, such as cooling operation, in the cascade refrigeration apparatus. For example, the control means 40 controls actions of the high-temperature side compressor 11, the high-temperature side expansion device 13, the low-temperature side compressor 21, the low-temperature side expansion device 23, and the like. In particular, in Embodiment 1, the control means 40 conducts control such that the evaporating temperature in the high-temperature side evaporator 14 is at or above a target evaporating temperature. A low pressure sensor 41 detects the pressure (low pressure) of the suction side of the high-temperature side compressor 11.

Next, actions or the like of components of the cascade refrigeration apparatus in cooling operation are described on the basis of flows of the refrigerant circulating through each of the refrigerant circuits. First, actions of the high-temperature side circulation circuit 10 in cooling operation are described. The high-temperature side compressor 11 sucks the high-temperature side refrigerant, compresses it, brings it into a high-temperature and high-pressure state, and discharges it. The discharged refrigerant flows into the high-temperature side condenser 12. The high-temperature side condenser 12 causes heat exchange between air, water, or the like supplied from the fan, pump, or the like (not illustrated) and the high-temperature side refrigerant, and makes the high-temperature side refrigerant condense and liquefy. The high-temperature side refrigerant, which has condensed and liquefied, passes through the high-temperature side expansion device 13. The high-temperature side expansion device 13 reduces the pressure of the refrigerant, which has condensed and liquefied and is passing therethrough. The refrigerant with a reduced pressure flows into the high-temperature side evaporator 14 (cascade capacitor 30). The high-temperature side evaporator 14 makes the high-temperature side refrigerant evaporate and gasify by heat exchange with the low-temperature side refrigerant. The high-temperature side refrigerant, which has evaporated and gasified, is sucked into the high-temperature side compressor 11. The high-temperature side compressor 11 discharges the high-temperature side refrigerant.

The high-temperature side circulation circuit 10 uses an HFO refrigerant as the high-temperature side refrigerant, as described above. HFO-1234ze, which is one example of HFO refrigerants, has a boiling point of approximately −19 degrees C. Accordingly, the inside of a pipe or the like on the low-pressure side under an environment where the evaporating temperature of the high-temperature side refrigerant is lower than the boiling point in the high-temperature side evaporator 14 has a negative pressure with respect to the pressure of the outside of the pipe (atmospheric pressure). To address this, the evaporating temperature in the high-temperature side evaporator 14 is prevented from being at or below the boiling point of the HFO refrigerant. Thus, for example, the target evaporating temperature in the high-temperature side evaporator 14 is set at −15 degrees C., and the control means 40 controls the operation frequency of the high-temperature side compressor 11 on the basis of a pressure according to detection by the low pressure sensor 41 such that the evaporating temperature in the high-temperature side evaporator 14 is at or above −15 degrees C., for example. In such a state of the high-temperature side refrigerant, the pressure inside the refrigerant circuit (pipe) is higher than the pressure outside the circuit. This can prevent the entry of foreign matter, such as air, into the pipe from the outside of the pipe and can reduce the production of sludge.

The control means 40 conducts control such that the high-temperature side compressor 11 is activated with a minimum operation frequency, such that the pressure difference inside the high-temperature side circulation circuit 10 is small, and such that the pressure on the low-pressure side is relatively high. The control means 40 conducts control such that the pressure is gradually reduced in a range where the evaporating temperature of the high-temperature side refrigerant in the high-temperature side evaporator 14 is at or above the target evaporating temperature. Preventing the pressure on the low-pressure side from rapidly decreasing and preventing the inside of the refrigerant circuit from having a negative pressure at the time of activation can block the entry of foreign matter, such as air, and can reduce the production of sludge at the time of activation.

The low-temperature side compressor 21 in the low-temperature side circulation circuit 20 sucks the low-temperature side refrigerant, compresses it, brings it into a high-temperature and high-pressure state, and discharges it. The discharged refrigerant flows into the low-temperature side condenser 22 (cascade capacitor 30). The low-temperature side condenser 22 makes the low-temperature side refrigerant condense and liquefy by heat exchange with the high-temperature side refrigerant. The low-temperature side refrigerant, which has condensed and liquefied, passes through the low-temperature side expansion device 23. The low-temperature side expansion device 23 reduces the pressure of the low-temperature side refrigerant, which has condensed and liquefied. The low-temperature side refrigerant with a reduced pressure flows into the low-temperature side evaporator 24. The low-temperature side evaporator 24 causes heat exchange between a cooling target object to be cooled and the low-temperature side refrigerant, and makes the low-temperature side refrigerant evaporate and gasify. At this time, the cooling target object is directly or indirectly cooled. Then the low-temperature side refrigerant flowing out of the low-temperature side evaporator 24 is sucked into the low-temperature side compressor 21. The low-temperature side compressor 21 discharges the low-temperature side refrigerant. As described above, even when the evaporating temperature in the high-temperature side circulation circuit 10, which uses the HFO refrigerant, is at or above −15 degrees C., cooling in a low-temperature range can be achieved by setting the evaporating temperature of the refrigerant in the low-temperature side evaporator 24 in the low-temperature side circulation circuit 20 at, for example, −45 degrees C.

For example, in the case where the refrigeration apparatus operates when the evaporating temperature of the low-temperature side refrigerant in the low-temperature side evaporator 24 is set at a value for cold-storage purpose (e.g., −10 degrees C.), the evaporating temperature of the high-temperature side refrigerant in the high-temperature side evaporator 14 in the high-temperature side circulation circuit 10 is around 8 to 10 degrees C. In the case where the refrigeration apparatus operates when the evaporating temperature of the low-temperature side refrigerant in the low-temperature side evaporator 24 is set at a value for freezing purpose (e.g., −40 degrees C.), the evaporating temperature of the high-temperature side refrigerant in the high-temperature side evaporator 14 is around −15 to −10 degrees C. Thus the operation with the settings for freezing purpose has a smaller difference between the evaporating temperature in the high-temperature side evaporator 14 and the boiling point of, for example, HFO-1234ze (approximately −19 degrees C.). Here, control and the like occurring when the refrigeration apparatus operates for freezing purpose are described.

Figure 2:
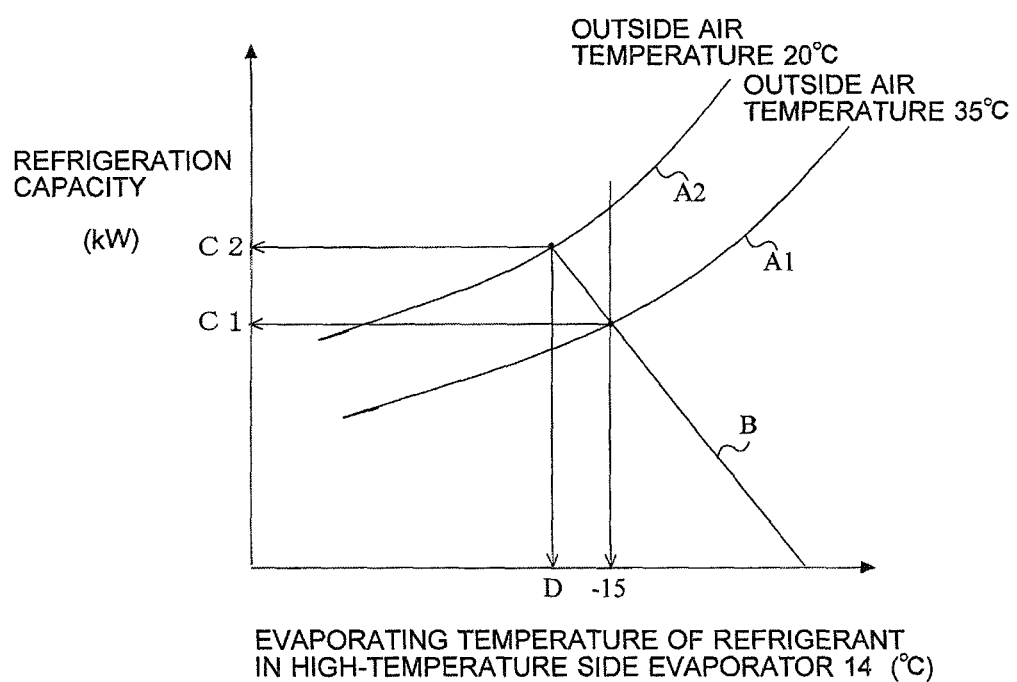
FIG. 2 illustrates a relationship between the evaporating temperature of a high-temperature side refrigerant and the refrigeration capacity of a high-temperature side circulation circuit 10.

FIG. 2 illustrates a relationship between the evaporating temperature of the high-temperature side refrigerant and the refrigeration capacity of the high-temperature side circulation circuit 10. In FIG. 2, the horizontal axis indicates the evaporating temperature of the refrigerant in the high-temperature side evaporator 14, and the vertical axis indicates the refrigeration capacity of the combination of the capacity of the high-temperature side compressor 11 and that of the high-temperature side condenser 12.

For example, a case is discussed in which the capacity is set such that, when the outside air temperature is 35 degrees C. (in summer), the evaporating temperature of the refrigerant in the high-temperature side evaporator 14 is −15 degrees C., in order to obtain a target refrigeration capacity. As illustrated in FIG. 2, at the point of intersection of the refrigeration capacity line A1 of the refrigeration capacity at the outside air temperature 35 degrees C. and the capacity line B for the high-temperature side evaporator 14, the operation is made with the refrigeration capacity C1 at the evaporating temperature −15 degrees C.

In contrast, during intermediate time, during wintertime, and the like, the condensing temperature in the high-temperature side condenser 12 decreases. Thus, the refrigeration capacity of the combination of the high-temperature side compressor 11 and the high-temperature side condenser 12 when the outside air temperature is, for example, 20 degrees C. is larger than that when the outside air temperature is 35 degrees C., as illustrated in FIG. 2 (refrigeration capacity line A2). Thus, at the point of intersection of the refrigeration capacity line A2 and the capacity line B of the high-temperature side evaporator 14, the operation is made with the refrigeration capacity C2 at the temperature D, which is lower than the evaporating temperature, −15 degrees C. At this time, the evaporating temperature may be lower than the boiling point of HFO-1234ze, depending on the case. At this time, the operation frequency of the high-temperature side compressor 11 is reduced such that the target evaporating temperature is −15 degrees C., thus decreasing the refrigeration capacity. This enables the evaporating temperature in the high-temperature side evaporator 14 to be kept at −15 degrees C. At this time, although the refrigeration capacity is reduced from C2 to C1, the refrigeration capacity is sufficient because the target refrigeration capacity is selected with reference to 35 degrees C., which is the reference value in the summer.

As described above, the refrigeration apparatus of Embodiment 1 is the cascade refrigeration apparatus in which the high-temperature side refrigerant in the high-temperature side circulation circuit 10 is an HFO refrigerant and the low-temperature side refrigerant in the low-temperature side circulation circuit 20 is a carbon dioxide refrigerant, and the evaporating temperature in the high-temperature side evaporator 14 is prevented from being at or below the boiling point of the HFO refrigerant. Accordingly, the inside of the high-temperature side circulation circuit 10 can be avoided from having a negative pressure, air or the like can be prevented from flowing into the high-temperature side circulation circuit 10, and the production of sludge can be suppressed. Even when the evaporating temperature in the high-temperature side circulation circuit 10 is high, the low-temperature side circulation circuit 20 enables cooling to a low-temperature range, and the cooling temperature range can be extended.

Embodiment 2

Figure 3:
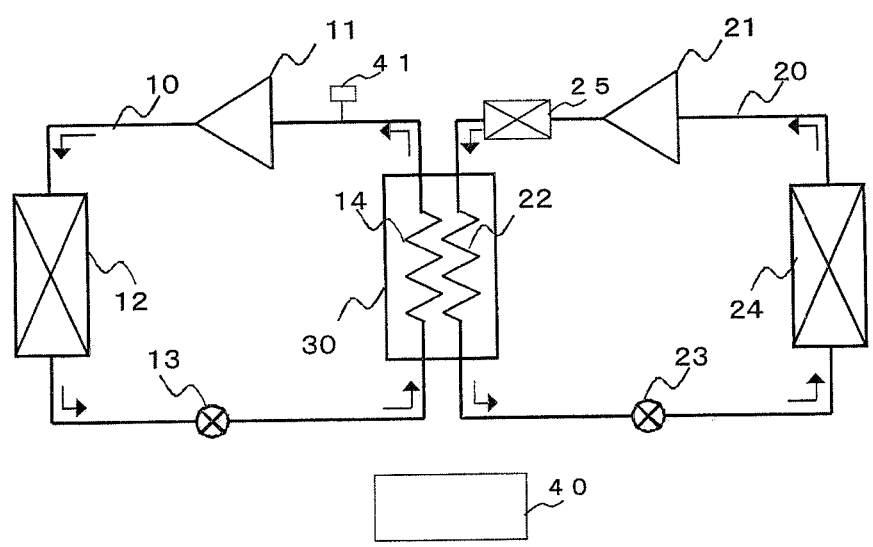
FIG. 3 illustrates a structure of a refrigeration apparatus according to Embodiment 2 of the invention.

FIG. 3 illustrates a structure of a refrigeration apparatus according to Embodiment 2 of the invention. In FIG. 3, the components having the same reference numerals as those in FIG. 1 act in the same way as the components described in Embodiment 1.

The refrigeration apparatus according to Embodiment 2 includes an auxiliary capacitor (intermediate cooler) 25 between the low-temperature side compressor 21 and the low-temperature side condenser 22. The auxiliary capacitor 25 functions as a gas cooler or a condenser, causes heat exchange between air, water, or the like supplied from, for example, the fan or pump (not illustrated) and the low-temperature side refrigerant, cools it to a predetermined temperature, and assists in making the low-temperature side refrigerant condense and liquefy in the low-temperature side condenser 22. Here, the auxiliary capacitor 25 may be unable to make the low-temperature side refrigerant condense and liquefy. The auxiliary capacitor 25 is at least required to cool the low-temperature side refrigerant to a certain temperature by taking heat (sensible heat) from the low-temperature side refrigerant. The fan or the like for supplying air or the like to the high-temperature side condenser 12 may be used as the fan or the like used here.

Providing the auxiliary capacitor 25 can reduce the amount of heat relating to heat exchange (amount of heat exchanged) between the high-temperature side refrigerant and the low-temperature side refrigerant in the cascade capacitor 30 (low-temperature side condenser 22 and high-temperature side evaporator 14). Thus the amount of the high-temperature side refrigerant in the high-temperature side circulation circuit 10 can be reduced.

Embodiment 3

Figure 4:
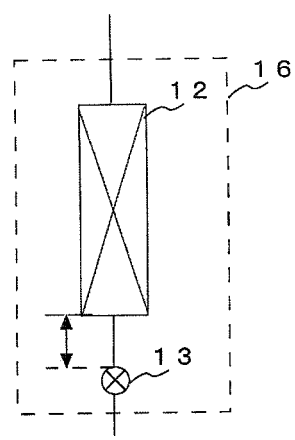
FIG. 4 illustrates a relationship between a high-temperature side condenser 12 and a high-temperature side expansion device 13 according to Embodiment 3 of the invention.

FIG. 4 illustrates a relationship between the high-temperature side condenser 12 and the high-temperature side expansion device 13 according to Embodiment 3 of the invention. Here, they are arranged so as to minimize the pipe connecting the high-temperature side condenser 12 and the high-temperature side expansion device 13. For example, as illustrated in FIG. 4, a valve integrated heat exchanger 16 in which the heat exchanger and the expansion device are integrated may be used. Arranging the high-temperature side condenser 12 and the high-temperature side expansion device 13 so as to have such a relationship can minimize the volume of the portion where the high-temperature side refrigerant becomes a liquid state (liquid refrigerant) in the high-temperature side circulation circuit 10. Because the liquid refrigerant has a high refrigerant density, reducing the portion where the refrigerant flows in the circulation circuit as the liquid refrigerant can reduce the amount of the refrigerant in the high-temperature side circulation circuit 10.

Figure 5:
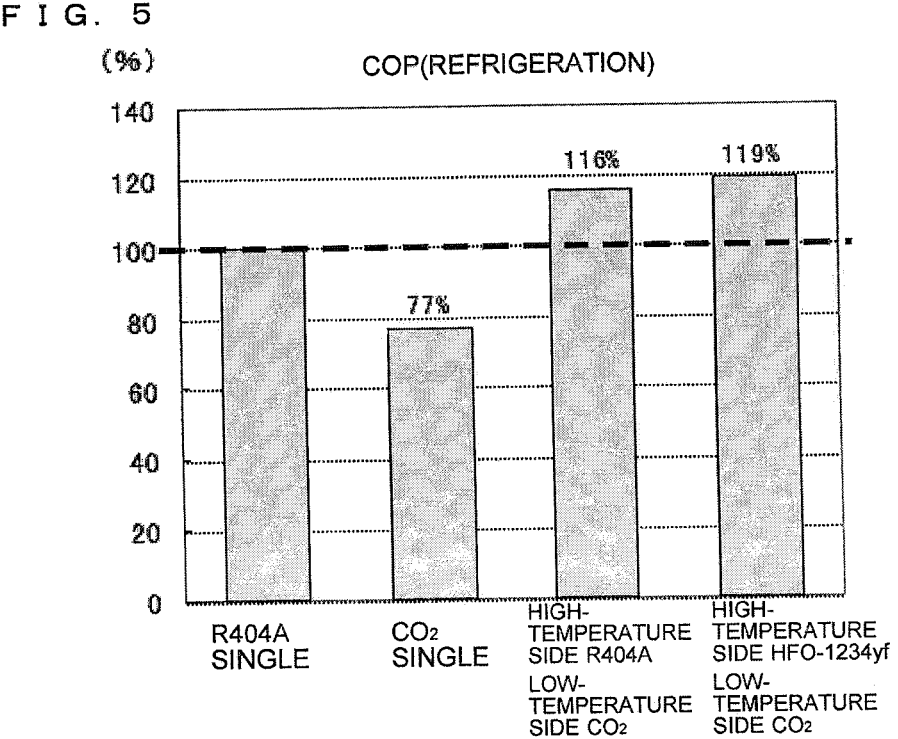
FIG. 5 illustrates comparison of COPs under refrigeration conditions of various modes.
Figure 6:
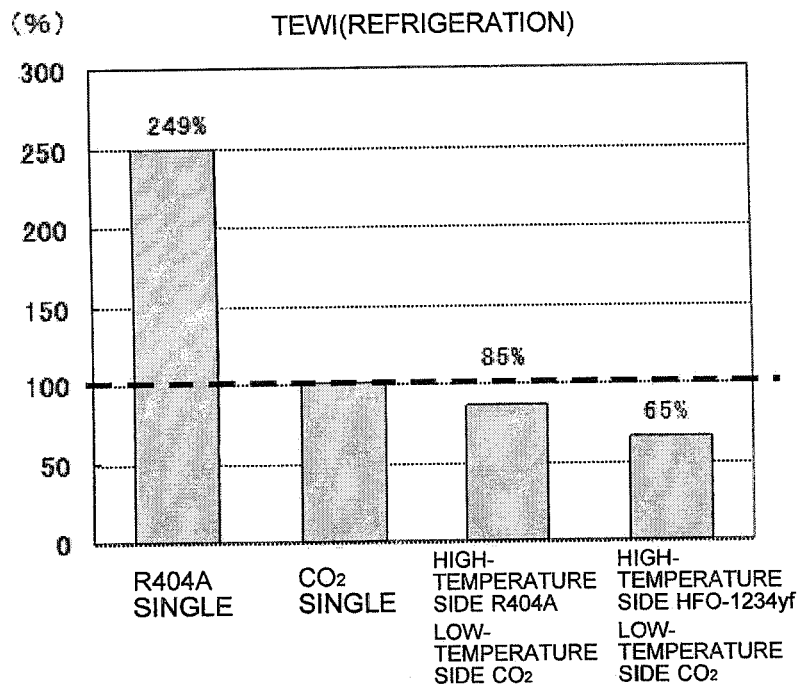
FIG. 6 illustrates comparison of TEWIs (total equivalent warming Impacts) under refrigeration conditions of various modes.

FIG. 5 illustrates COPs in refrigeration apparatuses with different refrigerant conditions in a low-temperature range (freezing range). FIG. 6 illustrates TEWIs (total equivalent warming Impacts) in refrigeration apparatuses with different refrigerant conditions in a low-temperature range. FIGS. 5 and 6 illustrate a result of cooling operation using R404A (GWP: 3922, for typical cooling apparatus for business use) as the refrigerant and a result of cooling operation using carbon dioxide (GWP: 1) as the refrigerant for a single-stage refrigeration apparatus including a single refrigerant circuit. FIGS. 5 and 6 also illustrate a result of cooling operation using R404A as the high-temperature side refrigerant and carbon dioxide as the low-temperature side refrigerant and a result of cooling operation using HFO-1234yf (GWP: 6) as the high-temperature side refrigerant and carbon dioxide as the low-temperature side refrigerant for the cascade refrigeration apparatus.

In FIG. 5, the COP in each refrigeration apparatus in cooling operation is expressed as the percentage to the COP in the single-stage refrigeration apparatus using the R404A refrigerant as 100%. Similarly, in FIG. 6, the TEWI in each refrigeration apparatus in cooling operation is expressed as the percentage to the TEWI in the single-stage refrigeration apparatus using the carbon dioxide refrigerant as 100%. The conditions relating to the operation are that the outside air temperature is 32 degrees C., the evaporating temperature in the evaporator on the load side (low-temperature side) of, for example, a showcase is −10 degrees C. (cold storage condition), and the refrigeration capacity is approximately 30 kW. The extended pipe in each of the single-stage refrigeration apparatus and the low-temperature side circulation circuit 20 has a length of 100 m. At this time, the diameter of the liquid pipe (diameter of the pipe through which the liquid refrigerant passes) is ϕ19.05 mm. The diameter of the gas pipe (diameter of the pipe through which the gas refrigerant passes) is ϕ38.1 mm.

Here, the above-described TEWI can be calculated by the following expression (1). Here, the parameters in (1) are described below. TEWI represents the total equivalent warming Impact (kg $CO_2$). GWP represents the global warming potential, m represents the refrigerant charge (kg) to the refrigerant circuit, L represents the annual refrigerant leakage rate (%), and n represents the apparatus operating time (year), α represents the collection rate of the refrigerant at the time of disposal, W represents the energy consumption per year (kWh/year), and β represents $CO_2$ emission intensity of power.

$$TEWI = GWP \times m \times L \times n + GWP \times m \times (1-\alpha) + n \times W \times \beta \quad (1)$$

In Embodiment 3, the annual refrigerant leakage rate L in each of the single-stage refrigeration apparatus and the low-temperature side circulation circuit 20 in the cascade refrigeration apparatus is 16% in consideration of extended piping in an actual location at the time of installation. The annual refrigerant leakage rate L in the high-temperature side circulation circuit 10 in the cascade refrigeration apparatus is 2% because the high-temperature side circulation circuit 10 in the cascade refrigeration apparatus is a closed refrigerant circuit that no piping is installed in an actual location. The apparatus operating time n is 15 years. The collection rate α at the time of disposal is 30%. The emission intensity β is 0.41 kg $CO_2$/kWh.

FIG. 5 reveals that the COP in the cascade refrigeration apparatus using HFO-1234yf as the high-temperature side refrigerant and the carbon dioxide refrigerant as the low-temperature side refrigerant in a low-temperature range is improved by approximately 19% in comparison with that in the single-stage refrigeration apparatus using R404A, which is typically used in a low-temperature range at present. FIG. 6 reveals that the TEWI in the above-described cascade refrigeration apparatus is smaller than that in the single-stage refrigeration apparatus using the carbon dioxide refrigerant and is reduced by approximately 30% in comparison with that in the single-stage refrigeration apparatus using R404A.

Embodiment 4

For example, in Embodiment 1 and other Embodiments described above, controlling the operation frequency of the high-temperature side compressor 11 is described in control on the evaporating temperature in the high-temperature side evaporator 14. However, for example, the evaporating temperature and the like may also be controlled by control on the opening degree of the high-temperature side expansion device 13.

The invention claimed is:

1. A refrigeration apparatus comprising:
a high-temperature side circulation circuit that forms a refrigerant circuit in which a high-temperature side compressor, a high-temperature side condenser, a high-temperature side expansion device and a high-temperature side evaporator are connected by a pipe, wherein the refrigerant circuit allows a high-temperature side refrigerant to circulate therethrough, the high-temperature side refrigerant has a carbon-carbon multiple bond in its molecular structure, and the high-temperature side compressor has a variable capacity and is configured to discharge the high-temperature side refrigerant;
a low-temperature side circulation circuit that forms a refrigerant circuit in which a low-temperature side compressor, a low-temperature side condenser, a low-temperature side expansion device and a low-temperature side evaporator are connected by a pipe, wherein the refrigerant circuit allows a low-temperature side refrigerant to circulate therethrough, the low-temperature side refrigerant contains carbon dioxide, and the low-temperature side compressor is configured to discharge the low-temperature side refrigerant;
a cascade capacitor formed of the high-temperature side evaporator and the low-temperature side condenser and configured to cause heat exchange between the high-temperature side refrigerant and the low-temperature side refrigerant;
a pressure detector for detecting a pressure on a suction side of the high-temperature side compressor; and
a controller for controlling an evaporating temperature of the high-temperature side refrigerant in the high-temperature side evaporator on a basis of the pressure according to detection by the pressure detector such that a pressure inside the high-temperature side circulation circuit does not have a negative pressure with respect to a pressure outside the circuit, wherein the controller is configured to
activate the high-temperature side compressor at a minimum operation frequency, and
reduce the pressure inside the high-temperature side circulation circuit until the pressure inside the high-temperature side circulation circuit is in a range where the evaporating temperature of the high-pressure side evaporator is at least at a target evaporating temperature so that a pressure inside the low-pressure side is prevented from decreasing.

2. The refrigeration apparatus of claim 1, further comprising an auxiliary capacitor disposed between the low-temperature side compressor and the low-temperature side condenser and configured to cool the low-temperature side refrigerant such that the low-temperature side refrigerant is at a predetermined temperature.

3. The refrigeration apparatus of claim 1, wherein the high-temperature side condenser and the high-temperature side expansion device are integrated with one another.

4. The refrigeration apparatus of claim 1, wherein the controller controls an operation frequency of the high-temperature side compressor on a basis of the pressure according to the detection by the pressure detector such that the evaporating temperature of the high-temperature side refrigerant in the high-temperature side evaporator is at or above a predetermined temperature.

5. The refrigeration apparatus of claim 4, wherein the controller drives the high-temperature side compressor so as to increase the operation frequency after activating the high-temperature side compressor with a minimum operation frequency.

6. The refrigeration apparatus of claim 2, wherein the high-temperature side condenser and the high-temperature side expansion device are integrated with one another.

7. The refrigeration apparatus of claim 2, wherein the controller controls an operation frequency of the high-temperature side compressor on the basis of the pressure according to the detection by the pressure detector such that the evaporating temperature of the high-temperature side refrigerant in the high-temperature side evaporator is at or above a predetermined temperature.

8. The refrigeration apparatus of claim 3, wherein the controller controls an operation frequency of the high-temperature side compressor on a basis of the pressure according to the detection by the pressure detector such that the evaporating temperature of the high-temperature side refrigerant in the high-temperature side evaporator is at or above a predetermined temperature.

9. The refrigeration apparatus of claim 6, wherein the controller controls an operation frequency of the high-temperature side compressor on a basis of the pressure according to the detection by the pressure detector such that the evaporating temperature of the high-temperature side refrigerant in the high-temperature side evaporator is at or above a predetermined temperature.

10. The refrigeration apparatus of claim 7, wherein the controller drives the high-temperature side compressor so as to increase the operation frequency after activating the high-temperature side compressor with a minimum operation frequency.

11. The refrigeration apparatus of claim 8, wherein the controller drives the high-temperature side compressor so as to increase the operation frequency after activating the high-temperature side compressor with a minimum operation frequency.

12. The refrigeration apparatus of claim 9, wherein the controller drives the high-temperature side compressor so as to increase the operation frequency after activating the high-temperature side compressor with a minimum operation frequency.

* * * * *